United States Patent Office 3,157,603
Patented Nov. 17, 1964

3,157,603
PROCESS FOR PREPARING CALCIUM HALO-
PHOSPHATE PHOSPHORS
Richard W. Mooney and Michael A. Aia, Towanda, Pa.,
assignors to Sylvania Electric Products Inc., a corporation of Delaware
No Drawing. Filed Mar. 29, 1962, Ser. No. 183,410
2 Claims. (Cl. 252—301.6)

This invention relates to phosphors and more particularly to calcium halophosphate phosphors having a cadmium antimonate compound incorporated into the matrix to increase the luminous efficiency of the phosphor. Furthermore such incorporation improves the particle size distribution and milling characteristics of the material.

Calcium halophosphate phosphors activated with manganese and antimony are known to the art, and methods have previously been devised for the addition of cadmium compounds to the matrix of such phosphors. In the United States patent to Aia et al., Number 2,965,786, it was disclosed that the efficiency of a calcium halophosphate phosphor can be increased by adding small and critical amounts of cadmium compounds in the form of chlorides, carbonates, acetates, peroxides, oxides, or phosphates. We have now found that although the addition of these compounds produces an increase in lamp efficiency, further improvements over such increases can be obtained if the cadmium compound is added as an antimonate. Particularly we have discovered that when a cadmium antimonate of the formula $Cd_2Sb_2O_6(X)$, where X is OH, O or F, is added to the starting materials mixture in certain proportions, the luminous efficiency of lamps using the phosphor is increased. Furthermore, the texture and particle size distribution of the phosphor is substantially improved when the cadmium is incorporated as an antimonate. We have discovered that 0.01 to 0.10 mole cadmium antimonate should be added per 3.00 moles of phosphate to the calcium halophosphate forming raw materials to obtain these improvements.

Accordingly, the primary object of this invention is to improve the efficiency of lamps using calcium halophosphate phosphors.

Another object of this invention is the improvement of phosphor particle size distribution to obtain lamp coatings of greater uniformity and better texture.

A feature of this invention is the addition of certain small quantities of cadmium antimonate to the raw material mixture for forming calcium halophosphate phosphors.

A further feature of this invention is the addition of 0.01 to 0.10 mole $Cd_2Sb_2O_6(X)$, where X is OH, O or F per 3.00 moles $PO_4$ to a raw material mixture of calcium halophosphate forming raw materials.

Other objects, features, and advantages of this invention will become apparent to those versed in the art upon reading the following specification wherein a preferred embodiment of our invention is described by way of illustrative examples.

According to our invention we intermix a cadmium antimonate, particularly $Cd_2Sb_2O_7$, $Cd_2Sb_2O_6OH$ and/or $Cd_2Sb_2O_6F$, together with the known materials necessary to form a calcium halophosphate phosphor. Any of these antimonates concurrently serves as a source of cadmium and as a source of antimony the latter being necessary for secondary activation of the phosphor. We have discovered that when these antimonates are used, less antimony is required to obtain maximum fluorescence and a softer phosphor of improved milling charcteristics is obtained. We believe that the relatively high concentrations of antimony used to prepare some of the phosphors of the prior art, for example 0.08 to 0.16 mole Sb per 3.00 moles $PO_4$ which corresponds to about 2 to 4% by weight on a basis of non-volatiles, tend to cause sintering during firing, thus resulting in a hard, dense material. Because the phosphor produced according to our invention is of a softer texture, and contains only about 0.5 to 0.9% Sb, the material does not have to be milled for too long a time before coating on the lamp envelope. Although we are able to obtain all of these advantages by the addition of a cadmium antimonate, there is no appreciable shift in normal excitation or emission spectra in the phosphor.

The effects of the use of cadmium antimonates as sources of cadmium and antimony in the calcium halophosphate phosphor is tabulated in Table I following:

TABLE I

| Source of Cd and Sb | Gram atom per 3.00 mols $PO_4$ | | Hrs. Milling Time to Obtain Coating Texture | 40 Watt lamps 100 hr. lumens |
|---|---|---|---|---|
| | Cd | Sb | | |
| CdO and $Sb_2O_3$ (control) | 0.06 | 0.09 | 1.0 | 2,912 |
| $Cd_2Sb_2O_7$ | 0.06 | 0.06 | 0.3 | 2,917 |
| $Cd_2Sb_2O_6F$ | 0.06 | 0.06 | 0.3 | 2,948 |
| $Cd_2Sb_2O_7$ | 0.04 | 0.04 | 0.3 | 2,920 |
| $Cd_2Sb_2O_6F$ | 0.04 | 0.04 | 0.3 | 2,920 |

It is quite apparent that although the separate addition of cadmium and antimony compounds produces good results, the use of a cadmium antimonate is even better. Not only is lamp brightness improved by the addition of the antimonate, but milling time requirements are shortened. Since prolonged milling necessitated by prior art methods tended to introduce detrimental superfines of less than 3 microns into the phosphor, this reduction in milling time is quite beneficial. Crystals are not broken into nonluminescent particles but rather an agglomerated mass is broken into luminescent crystals of about 3 to 30 microns. Therefore it appears that the phosphor is not actually milled, but rather is deagglomerated.

Although we do not intend to limit our invention to a particular theory, we believe that when a cadmium antimonate compound is intermixed with the starting materials, it is more efficiently incorporated into the crystal structure than when the cadmium and antimony are incorporated as separate compounds. Since we have found that an optimum phosphor has the lowest amount of antimony required to obtain maximum luminescence, the addition of a cadmium antimonate allows for less antimony addition because of the ease with which it diffuses into the matrix.

We also believe that in our process, the antimony goes into the lattice as a trivalent cation. Since pentavalent antimony tends to quench the phosphor emission, the trivalent incorporation is highly beneficial. Pentavalent antimony apparently is an ultraviolet absorber or possibly reacts with mercury ions in the lamp thus reducing lamp brightness by interfering with the process wherein energy is absorbed by trivalent antimony to be later emitted as useful fluorescent light.

When not available commercially, $Cd_2Sb_2O_6F$ can conveniently be synthesized by air-firing an intimate mixture of CdO (1.60 moles), $CdF_2$ (0.50 mole) and $Sb_2O_3$ (1.00 mole) for 3 hours at 480° C. After firing, the excess CdO is washed out with nitric acid and the residue washed several times with water. $Cd_2Sb_2O_7$ can be prepared by reacting CdO (2.1 moles) with $Sb_2O_3$ (1.00 mole) with similar procedures and conditions.

The following specific examples are offered as a further explanation of our invention, but they are not intended to be limitative upon the claims.

Example I

| Material | Gram-moles | Grams | Wt. Percent |
|---|---|---|---|
| $CaHPO_4$ | 3.00 | 408.3 | 66.15 |
| $CaCO_3$ | 1.35 | 135.1 | 21.89 |
| $CaF_2$ | 0.40 | 31.2 | 5.06 |
| $NH_4Cl$ | 0.30 | 16.0 | 2.59 |
| $MnCO_3$ | 0.08 | 9.2 | 1.49 |
| $Cd_2Sb_2O_7$ | 0.03 | 17.4 | 2.82 |
| | | 617.2 | 100.00 |

These finely-divided powders are intimately blended and then fired for 6 hours at 1150° C. in closed silica crucibles to obtain luminescent powder, as is well known in the art. The crushed powders are then pebble-milled in nitrocellulose lacquer, and the resultant suspension is used to prepare fluorescent lamps, as described in previous patents.

Example II

| Material | Gram-moles | Grams | Wt. Percent |
|---|---|---|---|
| $CaHPO_4$ | 3.00 | 408.3 | 66.83 |
| $CaCO_3$ | 1.30 | 130.0 | 21.28 |
| $CaF_2$ | 0.40 | 31.2 | 5.11 |
| $NH_4Cl$ | 0.30 | 16.0 | 2.62 |
| $MnCO_3$ | 0.12 | 13.8 | 2.26 |
| $Cd_2Sb_2O_6(F)$ | 0.02 | 11.6 | 1.90 |
| | | 610.9 | 100.00 |

The above described finely-divided powders are intimately blended, then fired for 6 hours at 1150° C. in closed silica crucibles to obtain a luminescent powder, as is well know in the art. The crushed powders are then pebble-milled in nitrocellulose lacquer, and the resultant suspension is used to prepare fluorescent lamps, as described in previous patents.

While certain specific embodiments of the invention have been described in detail, the same are given as illustrative and not in order to limit the invention thereto. The scope of the invention is to be determined by the appended claims.

As our invention we claim:

1. In the manufacture of a calcium halophosphate phosphor the steps which comprise: mixing ingredients necessary to form said calcium halophosphate phosphor together with 0.01 to 0.10 mole of a cadmium antimonate per 3 moles of $PO_4$; firing said mixture in a furnace to form a calcium halophosphate phosphor containing cadmium and antimony.

2. In the manufacture of a calcium halophosphate phosphor the steps which comprise: mixing ingredients necessary to form said calcium halophosphate phosphor together with for every 3 moles $PO_4$, 0.01 to 0.1 mole $Cd_2Sb_2O_6(X)$, where X is at least one member selected from the group consisting of O, OH and F; firing said mixture to form a calcium halophosphate phosphor containing cadmium and antimony.

References Cited in the file of this patent

UNITED STATES PATENTS

| 2,592,261 | Fonda | Apr. 8, 1952 |
| 2,904,516 | Ross et al. | Sept. 15, 1959 |

FOREIGN PATENTS

| 829,771 | Great Britain | Mar. 9, 1960 |
| 631,655 | Canada | Nov. 28, 1961 |